United States Patent [19]

Hicks

[11] Patent Number: 5,341,591
[45] Date of Patent: Aug. 30, 1994

[54] PLANER BOARD

[76] Inventor: Carl E. Hicks, 76200 True Rd., Armada, Mich. 48005

[21] Appl. No.: 913,629

[22] Filed: Jul. 16, 1992

[51] Int. Cl.⁵ ............... A01K 91/08; A01K 73/045
[52] U.S. Cl. .................................. 43/43.13; 43/9.7
[58] Field of Search ............ 43/43.13, 9.7; D22/134

[56] References Cited

U.S. PATENT DOCUMENTS

| | | |
|---|---|---|
| 1,307,623 | 6/1919 | Edmondson . |
| 1,723,236 | 8/1929 | Hansen . |
| 2,572,427 | 10/1951 | Anglim ............................ 43/43.13 |
| 2,582,754 | 1/1952 | Kahler ............................ 43/43.13 |
| 2,597,288 | 5/1952 | Caldwell ......................... 43/43.13 |
| 2,707,348 | 5/1955 | Kahler ............................ 43/43.13 |
| 2,965,998 | 12/1960 | Kuismi ........................... 43/43.13 |
| 3,142,929 | 8/1964 | Killilea .......................... 43/43.13 |
| 3,216,147 | 11/1965 | Minera ........................... 43/43.13 |
| 3,230,660 | 1/1966 | Meyers ........................... 43/43.13 |
| 3,410,014 | 11/1968 | Jenssen ................................ 43/9 |
| 3,464,142 | 9/1969 | Hubbart .......................... 43/43.13 |
| 3,470,649 | 10/1969 | Cole ............................... 43/43.13 |
| 3,507,068 | 4/1970 | Roberts ............................... 43/17 |
| 3,648,775 | 7/1973 | Wagner .......................... 43/43.13 |
| 3,760,762 | 9/1973 | Spongberg ..................... 114/235 R |
| 3,818,624 | 6/1974 | Duffy ............................. 43/43.13 |
| 3,908,299 | 9/1975 | Kalberer ......................... 43/43.13 |
| 3,949,512 | 4/1976 | Stegemeyer ..................... 43/43.13 |
| 3,973,347 | 8/1976 | Kearney ............................... 43/17 |
| 4,028,840 | 6/1977 | Wille ............................. 43/43.13 |
| 4,524,538 | 6/1985 | Halvorsen ....................... 43/43.13 |
| 4,703,580 | 11/1987 | Kammeraad ..................... 43/43.13 |

Primary Examiner—Paula A. Bradley
Assistant Examiner—Jeanne M. Elpel
Attorney, Agent, or Firm—Krass & Young

[57] ABSTRACT

A trolling assembly, adapted to be connected to a fishing boat by a tow line so that the assembly is drawn behind the boat and laterally to the course of the boat allowing a plurality of trolling fishing lines from the boat to be connected to spaced points on the connecting lines, employs three substantially identical planer boards. Each board is an elongated, flat rectangular and has a central slot. A pair of extending arms are pivotally joined to the slots within each board so that arms may be positioned in extending position wherein the boards are parallel to one another and spaced from one another, or a collapsed position in which the arms lie substantially within the slots and the opposed surfaces of the three stacked boards abut one another.

4 Claims, 3 Drawing Sheets

PLANER BOARD

FIELD OF THE INVENTION

This invention relates to a trolling assembly adapted to be drawn behind a fishing boat so that a plurality of fishing lines may be supported from spaced points along the line connecting the assembly to the boat, and more particularly, to such an assembly employing three identical planer boards, having central slots, and joined to one another by extending arms pivotally supported within the slots.

BACKGROUND OF THE INVENTION

In order to support a number of fishing lines in spaced relationship with one another off of a fishing boat and to maintain the lines displaced laterally with respect to the course of the boat, out of its wake, buoyant trolling floats have been devised. Variously termed outrigger floats, planer boards or trollers, these devices are adapted to be connected to a moving fishing boat by a tow line. The devices are shaped such that they move laterally out to the side of the boat as they are towed. A number of fishing lines may be arrayed from the boat and supported at spaced points along the taut towing rope by means of snap support elements which allow a fishing line to release from the towing rope when a fish bites on a lure connected to the trailing end of the line.

The force that moves the trolling device laterally of the boat as it is towed behind the boat is proportional to the surface area of the device and by using a pair of buoyant boards supported parallel to one another, the surface area may be increased without unduly extending the length of the board and the stability of the trolling device is improved. Trolling devices employing a pair of boards are disclosed in U.S. Pat. Nos. 1,307,623; 3,142,929; 3,973,347; and 4,703,580, among others. Certain of these multiple board devices are connected by pivotable links which support the boards in spaced apart, parallel relationship when extended or in direct abutment with one another when the links are retracted to present a compact storage configuration.

I have previously manufactured and sold such a trolling assembly employing a pair of identical planer boards. The boards were generally flat and rectangular and had central slots formed longitudinally. Two connecting arms each had their ends pivotally connected to the two boards by pinned joints which bridged the slots. The two arms were spaced from one another along the length of the boards and along with the boards formed a four element linkage. The arms could be moved between an extended position, in which they projected generally normally to the planer surface of the boards and supported the boards in an operative spaced position from one another, or a retracted position in which the arms lay within the slots and the opposed board surfaces abutted one another, for compact storage purposes.

I have now conceived and developed an improved version of this trolling assembly, employing three or more substantially identical planer boards joined by a simple, compact linkage mechanism which maintains the boards equally spaced from one another when in an extended position, or closely stacked with their adjacent surfaces abutting for storage purposes. This arrangement provides increased lateral force and greater stability without increasing the overall dimensions of the assembly.

SUMMARY OF THE PRESENT INVENTION

The trolling assembly of the present invention consists of three or more identical, buoyant boards. Each board takes the form of an elongated, relatively flat rectangle having a surface on one side of its leading edge tapered in the direction of the other side to form a sharp leading edge. The lateral asymmetry provided by this taper steers the assembly laterally relative to the boat when it is towed. The boards each have a central elongated slot extending through their thicknesses. The slots terminate a spaced distance from each of the ends of the boards. The boards are joined together by two or more rectangular arms. In the preferred embodiment of the invention, taking the form of a three-board assembly, two arms are employed and each arm is formed with a center bushing and two end bushings. Each arm is pivotally supported to the center board by a pin connection which extends across the slot and through the center bushing. Each of the arms is pivotally connected to the two outer boards with similar pinned connections passing through the central slots of the outer boards and through the end bushings of the arms.

These pinned connections form a five element linkage in which the boards are supported parallel to one another. When the arms are pivoted so as to extend generally normally to the surfaces of the boards, the boards are supported in spaced parallel relationship with respect to one another and when the arms are pivoted so as to extend generally parallel to the board surfaces, the opposed surfaces of the three boards abut one another and the arm sections lie within the slots in a compact manner.

The arms each consist of a pair of linear sections joined in angled section at their adjacent ends. The center bushing is formed through the angled section. The two linear sections extend parallel to one another but laterally displace from one another by the jogged center section. This allows the two arm sections to lie fully within the slots in the storage configuration.

The planer boards are preferably formed of injection molded plastic with compartments which are filled with a buoyant plastic foam. Planer plastic cover plates are thermally welded to the main assembly to cover and protect the foam.

The trolling assembly of the present invention is thus compact in configuration, relatively low in cost and yet provides excellent stability and is simple to use.

Other objectives, advantages and applications of the present invention will be made apparent by the following detailed description of the preferred embodiment to the invention.

BRIEF DESCRIPTION OF THE DRAWINGS

The description makes reference to the accompanying drawings in which.

DETAILED DESCRIPTION OF THE PREFERRED EMBODIMENT

Figure 1:
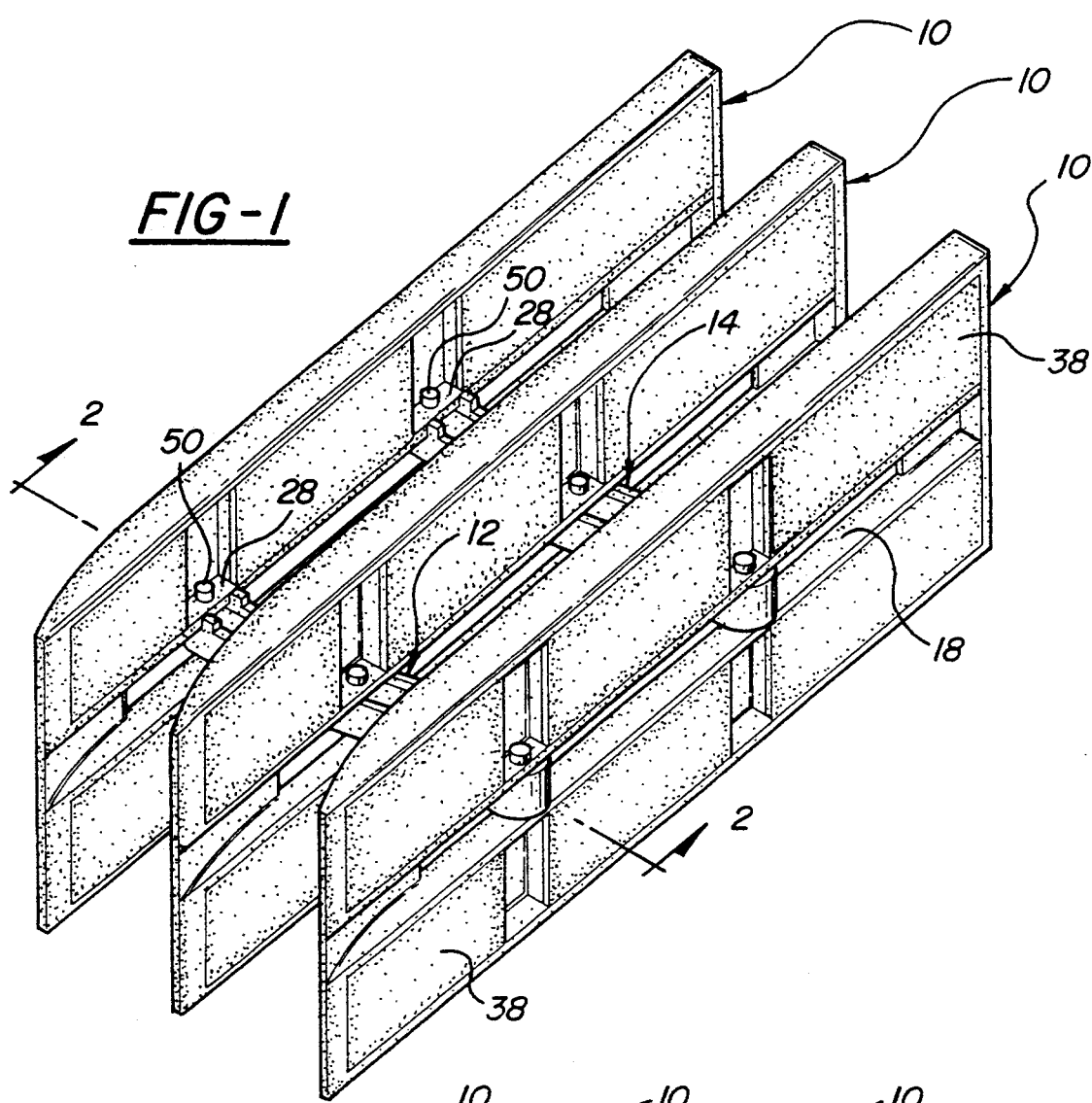
FIG. 1 is perspective view of a trolling assembly forming a preferred embodiment of the invention, in extended, operative configuration.
Figure 2:
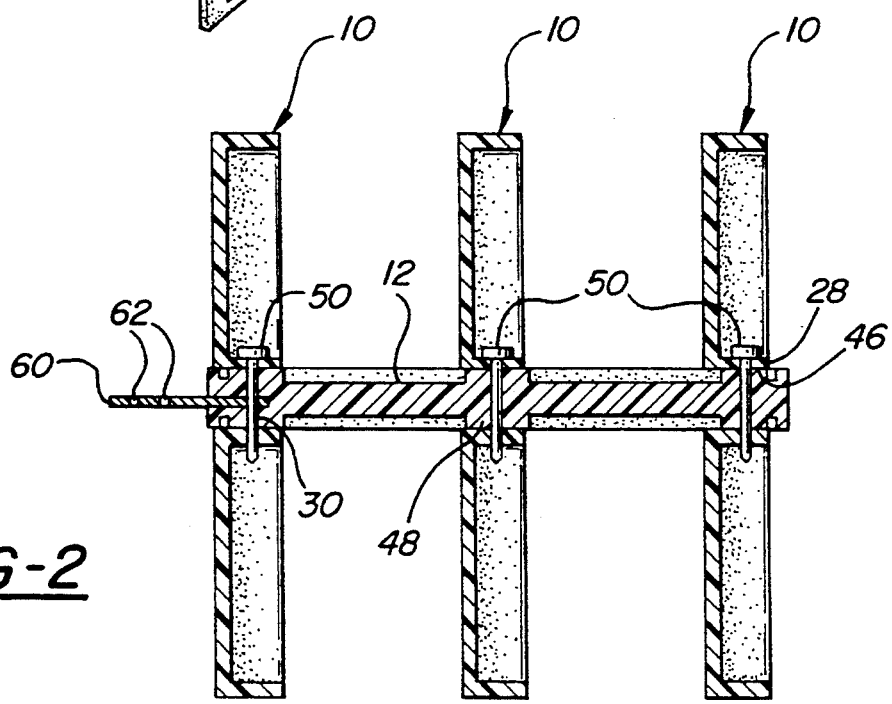
FIG. 2 is a sectional view through FIG. 1, taken along line 2—2 of FIG. 1.

Referring to the drawings, the preferred embodiment to the invention takes the form of three identical buoyant planer boards, generally indicated at 10 joined to one another by a pair of identical coupling arms, a forward coupling arm generally indicated at 12 and a rear coupling arm generally indicated at 14. In alternative embodiments, more than three of the boards 10 may be joined in an assembly and more than two of the connecting arms 12 and 14 may be employed. The three board, two-arm configuration is efficient and effective and constitutes the preferred embodiment to the invention.

Figure 4:
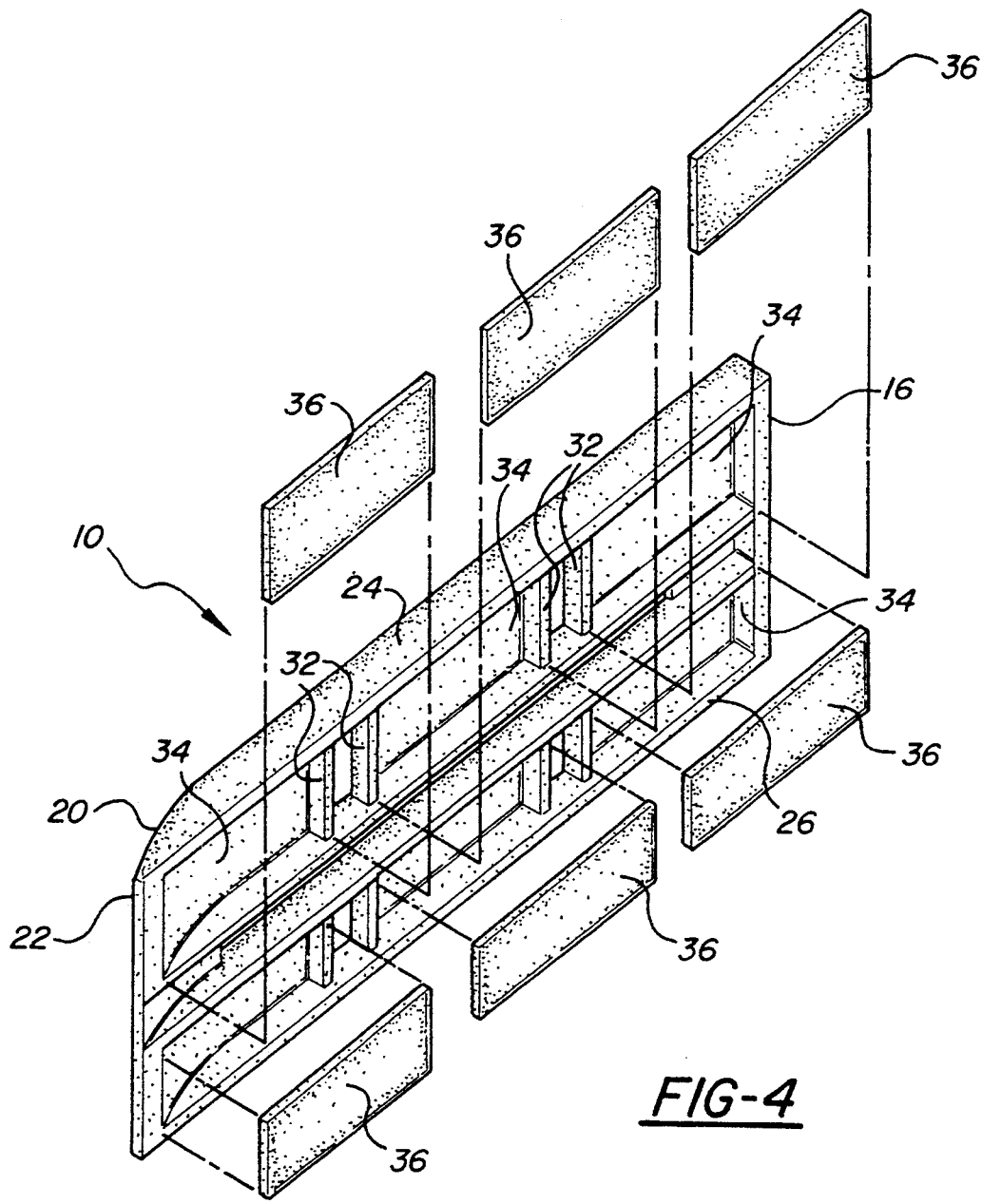
FIG. 4 is a perspective, exploded view of one of the planer boards used with the trolling assembly of the present invention.

As best illustrated in the exploded view of FIG. 4, each board 10 is formed about an injection molded polyethylene base member 16. The base member constitutes a generally rectangular structure having a central, rectangular, elongated slot 18 terminating short of each end of the base member 16. The forward wall of the base member is formed with a curved taper 20 terminating in a sharp forward edge 22. Transverse side walls 24 and 26 are formed along the opposite edges of the base and transverse side walls of a similar depth 28 and 30 are formed on the bordering sides of the elongated slot 18. The transverse walls 28 and 30 extend the full length of the base 16, beyond the terminations of the slot 18. A series of lateral walls 32 divide each section of the base 16, on either side of the slot 18, into three compartments 34, so that each base member has six compartments 34, three on each side of the slot 18. Each compartment 34 is filled with a buoyant plastic foam section 36, preferably formed of polystyrene beads. Each compartment is then closed by a rectangular sheet plastic cover plate 38, which is thermally welded over the open top of each compartments at a number of spaced points encapsulating the foamed plastic 36 in such a way as to seal the compartment yet allow for the entry of some water between the spaced points providing necessary ballast.

Figure 5:
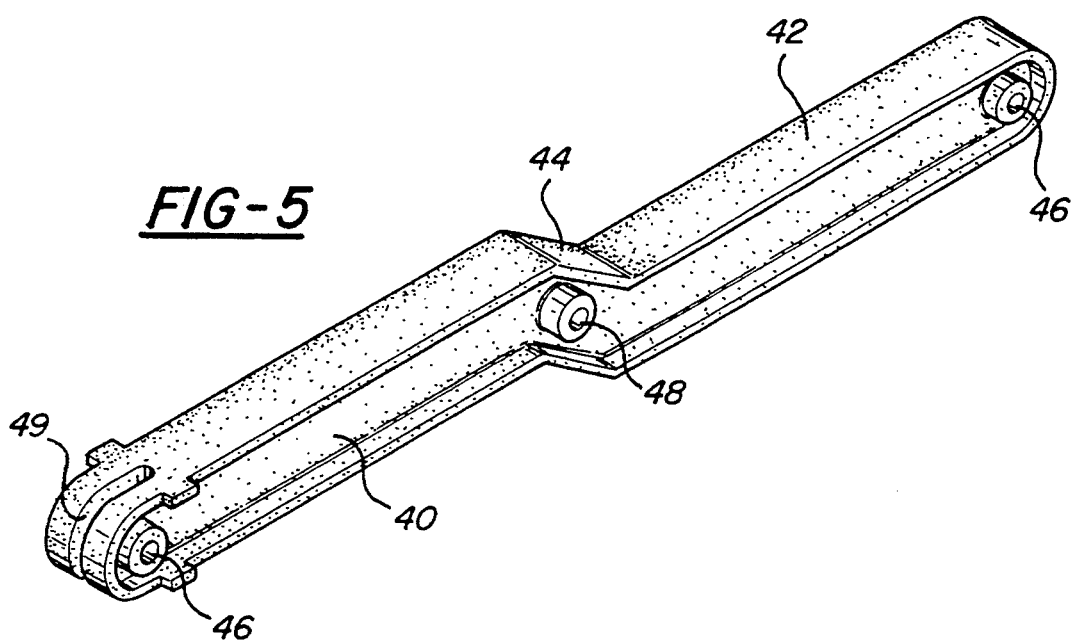
FIG. 5 is a perspective view of a connecting arm forming part of the trolling assembly.

The connecting arms 12 and 14 are identical and, as illustrated in FIG. 5, the arm consists of an injection molded plastic section having a pair of straight, generally parallel end sections 40 and 42 slightly displaced from one another by a jog center section 44. Each arm 14,16 has a generally rectangular cross section. Cylindrical bushings 46 are formed through the two end sections of the arms 14,16 and a similar cylindrical bushing 48 is formed through the center of the jog section 44.

The arms 12 and 14 connect to the boards 10 at the elongated slots 18, so that the arms 12 and 14 lie within the slots. The arms are connected to the two outer boards by pins 50 which pass through bushings 46 in the opposed ends of the arms 12 and 14. The arms 12 and 14 are similarly connected to the center board 10 in the assembly by pins 50 which pass through the center bushings 48. Each arm has a slot 49, formed at one end, separating the bushing 46 at that end into two sections.

Figure 3:
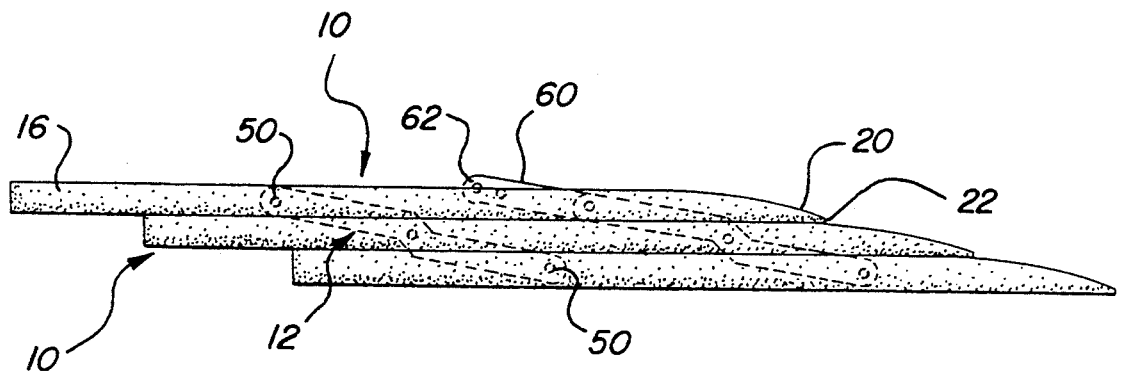
FIG. 3 is a side view of the preferred embodiment of the invention in compact storage configuration.

The three boards 10 and the two arms 12 and 14 thus form a five element linkage. The arms 12 and 14 may lie substantially within the slots 18, parallel to the longitudinal axes of the boards 10, so that the surfaces of the boards abut one another in a compact, storage configuration as illustrated in FIG. 3. As the boards are pulled apart, pivoting the arms 12 and 14 so that they extend laterally to the plane of the boards, the boards are maintained in parallel relationship in an extended position as illustrated in FIG. 1.

A steel plate 60 with two holes 62, formed along its length, has one end secured to the forward most arm 12 of the assembly by the pin which passes through the bushing 46 at the slot 49 so that the plate forms an extension of the arm and projects outwardly from the assembly when the assembly is in its extended position of FIG. 1 and lies largely within the slot 18 when the assembly is in the collapsed position of FIG. 3. This allows a towing rope to be secured to the assembly.

Figure 6:
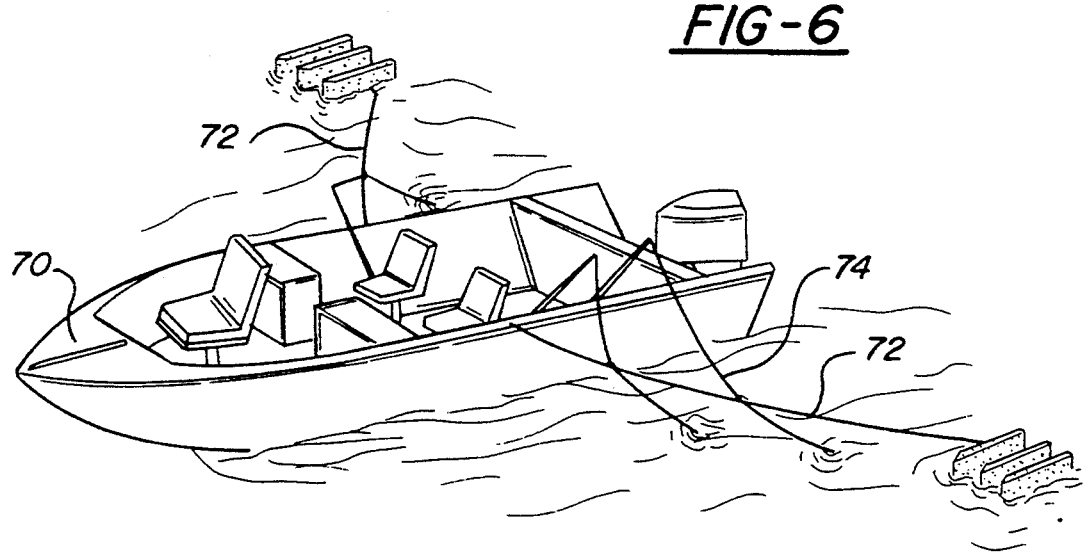
FIG. 6 is a schematic illustration of the manner of use of the board is towed behind a fishing boat.

The trolling assembly is used in a manner illustrated in FIG. 6. Two of the assemblies are preferably towed behind a boat 70 by means of towing ropes 72 secured within the hole 62 in a plate 60. The curved surfaces 20 of the two assemblies are disposed in opposite directions so that they are displaced in opposite lateral directions from the boat 70 because of the water force exerted on the curved surfaces. A plurality of fishing lines 74 may be arrayed from the boat and connected to points on the taut towing lines 72 by commercially available snap fasteners so that the fishing lines 74 are displaced laterally relative to one another behind the boat and are displaced from the wake of the boat. When a fish bites a lure or bait attached to the trailing end of one of the fishing lines 74, the resultant pull on the line displaces the line from the snap fastener so that the fish may be worked in the normal manner.

Having thus described my invention, I claim:

1. A trolling assembly comprising three substantially identical planer boards, the boards each being a buoyant, flat, elongated, rectangular member having a central, longitudinally aligned slot terminating short of each end of the board and having one of its flat end surfaces tapered toward the opposed flat end surface so as to form a relatively sharp leading edge; and a pair of extension arms connecting said planer boards to one another in stacked, parallel relationship consisting of two outside boards sandwiching a center planar board, each arm having its midpoint pivotally connected to the center planer board of said stack at the central slot, for movement in a plane transverse to the plane of said board, the two arms being spaced from one another along said central slot, and each arm having two opposed ends similarly pivotally connected to the two outside boards of the stack at pivotal axes disposed within the central slots of said two outside boards, whereby said arms may be positioned to extend generally transverse to the planes of the boards so that the boards are supporting in spaced parallel relationship to one another or the arms may be positioned in a retracted position in which the arms lie substantially within said slots and the opposed planer surfaces of the three boards abut one another in a collapsed position.

2. The trolling assembly of claim 1, further including an extension, fixed to one of the ends of the arm connected adjacent the leading edge of the board, adapted to project outwardly beyond the surface of the outer board in the stack at such time as the arms are in their extended position and having means for securing a towing line to the extension.

3. The trolling assembly of claim 2 in which each arm consists of two linear sections connected at their ends by an intermediate section, the two end sections extending parallel to and slightly laterally displaced form one another, the intermediate sections being pivotally connected within said central slot of the central planar board of the stack, whereby, when the arms are retracted so that the boards opposed faces abut one another, the two end sections of each arm are substantially encompassed within the central slots of two outer boards of the assembly.

4. The trolling assembly of claim 1 wherein each board is formed of injection molded plastic.

* * * * *